United States Patent Office 3,280,155
Patented Oct. 18, 1966

3,280,155
6-METHYLPROGESTERONES
William P. Schneider and George B. Spero, Kalamazoo, Mich., assignors to The Upjohn Company, Kalamazoo, Mich., a corporation of Delaware
No Drawing. Filed Apr. 7, 1965, Ser. No. 446,385
5 Claims. (Cl. 260—397.3)

This application is a continuation-in-part of application Serial No. 623,774, filed November 23, 1956, now abandoned.

The present invention relates to steroid compounds and is more concerned with 6-hydrocarbyl-substituted progesterones and particularly with 6-methylprogesterone, the intermediates therefor and a process of production thereof.

The new compound and the process of the present invention are illustratively represented by the following formulae:

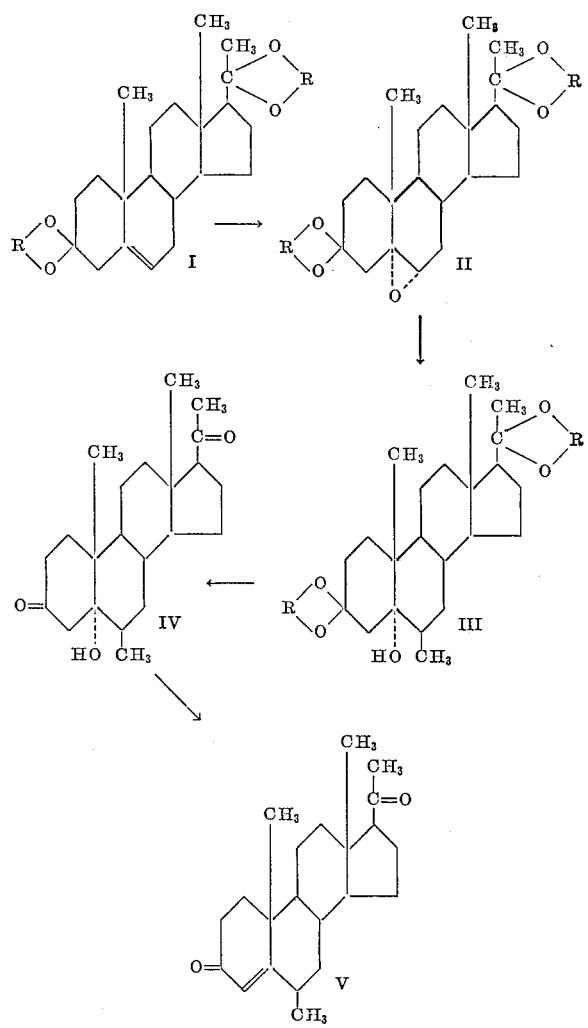

wherein R is an alkylene radical containing not more than eight carbon atoms, inclusive, and the attaching oxygen to carbon bonds are separated by a chain of at least two and not more than three carbon atoms.

The process of the present invention comprises: treating a progesterone 3,20-bis-(alkylene ketal) (I), with a peracid, such as performic, peracetic, and perbenzoic to obtain 5α,6α-oxidoallopregnane-3,20-dione 3,20-bis-(alkylene ketal) (II); treating the thus obtained 5α,6α-oxido-allopregnane-3,20-dione 3,20-bis-(alkylene ketal) (II) with a methyl metal compound, preferably a methyl metal halide and specifically a methyl Grignard reagent to give the corresponding 5α-hydroxy-6β-methylallopregnane-3,20-dione 3,20-bis-(alkylene ketal) (III); hydrolyzing with acid in a suitable solvent the thus obtained diketal (III) to yield 5α-hydroxy-6β-methylallopregnane-3,20-dione (IV), and dehydrating the thus obtained 5α-hydroxy-6-methylallopregnane-3,20-dione (IV) with a base or an acid to obtain essentially 6β-methyl-4-pregnene-3,20-dione (6-methylprogesterone) (V). Large amounts of base or acid produce some 6α-epimer. The 6β-methylprogesterone can also be converted to 6α-methylprogesterone by enolyzing agents selected from mineral acids or bases, e.g., sulfuric, chloric, hydrochloric, nitric (dilute), or alkali bases such as sodium or potassium hydroxide or carbonate. Using in the second step of the reaction other organometallic compounds, such as alkyl lithium compounds, dialkyl cadmium compounds, alkyl and phenyl cadmium halides, aryl and alkyl calcium halides such as phenyl calcium iodide and especially alkyl and phenyl Grignards such as ethyl, propyl, butyl, phenyl magnesium bromide or iodide results in other 5α-hydroxy-6-alkyl- or 6-phenyl-allopregnane-3,20-diones 3,20-diketals which by the subsequent steps are converted to the corresponding 6-alkyl- or 6-aryl-4-pregnene-3,20-diones.

It is an object of the instant invention to provide the 6-methylprogesterone and intermediates for the production thereof such as 5α-hydroxy-6β-methylallopregnane-3,20-dione and the alkylene ketals thereof, having from one to eight carbon atoms in the alkylene chain. It is another object of the instant invention to provide a process for the production of 6-methylprogesterone (both the 6α and 6β-epimers) and the intermediate 5α-hydroxy-6β-methylallopregnane-3,20-dione and 3,20-bis-(alkylene ketals) thereof. Other objects of this invention will be apparent to those skilled in the art to which this invention pertains.

The new product 6-methylprogesterone has utility as an intermediate in the production of 6-methylhydrocortisone and 6-methylcortisone and ester thereof which compounds have glucocorticoid and anti-inflammatory activity in excess of hydrocortisone and the Δ¹-hydrocortisone and are therefore employable in the treatment of arthritis (cf. copending application S.N. 601,601, filed August 2, 1956). Production of 6-methylcortisone and 6-methylhydrocortisone from 6-methylprogesterone is shown in Example 6. Other highly active agents which can be made from 6-methylprogesterone are 6-methyl-21-fluoroprogesterone, 1-dehydro-21-fluoro-6-methylprogesterone, and 1-dehydro-6-methylprogesterone, as shown in Examples 8, 9, and 11. These compounds exhibit marked progestational activity, central nervous system depressant activity, gonadotropin inhibiting and pituitary inhibiting activity, and have a regulating effect on water and electrolyte metabolism. As such, they are useful either in oral preparations, tablets etc. or as injectables in the management of functional uterine bleeding, amenorrhea, dysmenorrhea, premenstrual tension, cyclic premenstrual edema and mazoplasia.

6-methylprogesterone is an intermediate in the production of 6-methyl desoxycorticosterone and its 1-dehydro analog as shown in Examples 7 and 10. These compounds show central nervous system depressant and anti-inflammatory activity and in addition are converted to the highly active anti-inflammatory agents 6-methylhydrocortisone and 1-dehydro-6-methylhydrocortisone of our copending applications Serial No. 601,601, now Pat. No. 3,141,876 and Serial No. 601,634, now abandoned, by incubation with the microorganisms *Cunninghamella blakesleeana* and *Cephalothecium roseum*.

6-methylprogesterone also serves as a starting material for the preparation of 6-methyl-17α,21-dihydroxy-4-pregnene-3,20-dione, 6-methyl-17α,21-dihydroxy-1,4-pregnadiene-3,20-dione, 6-methyl-17α-hydroxy-4-pregnene-3,20-dione, 6-methyl-17α-hydroxy-21-fluoro-4-pregnene-3,20-dione, 6-methyl-17α-hydroxy-1,4-pregnadiene-3,20-dione and 6-methyl-17α-hydroxy-21-fluoro-1,4-pregnadiene-3,20-dione as shown in Examples 12–17. These compounds are useful in that they are converted by incubation with the microorganism *Cunninghamella blakesleeana* to the corresponding 11β-hydroxy analogues which compounds show pronounced anti-inflammatory activity.

Both the 6α- and the 6β-methylprogesterone per se have marked progestational activity, central nervous system depressant activity, gonadotropin regulating and pituitary inhibiting activity, and have a regulating effect on water and electrolyte balance. As such, it is useful in the management of functional uterine bleeding, amenorrhea, dysmenorrhea, premenstrual tension, and cyclic premenstrual edema and may be administered in tablets or injectable preparations.

The starting compound of the instant invention is progesterone 3,20-diketals, produced as shown for progesterone 3,20-bis-(ethylene ketal) [cf. Hyp J. Dauben Jr., J. Am. Chem. Soc. 76, 1359 (1954) and Preparations 1 and 2].

In carrying out the process of the present invention the selected progesterone 3,20-bis-(ethylene ketal) is dissolved in an organic solvent such as chloroform, methylene chloride, ethylene dichloride, carbon tetrachloride, benzene, toluene, or the like, and treated with an organic peracid such as performic, peracetic, perpropionic, perbenzoic, monoperphthalic acid or other organic peracids. The reaction is generally carried out at low temperatures such as between minus ten and plus ten degrees centigrade. However, higher or lower temperatures such as minus thirty to up to plus forty degrees centigrade are operable. In the preferred embodiment of the instant invention temperatures between zero and five degrees, a chlorinated hydrocarbon such as chloroform or methylene dichloride and peracetic or perbenzoic acid are used. The peracid is used in a quantity usually from ten to twenty percent above the one theoretically required up to five times the one required by theory.

At the end of the reaction the excess acid is neutralized, preferably with sodium or potassium carbonate or bicarbonate, washed with water and the thus obtained 5α,6α-oxidoallopregnane-3,20-dione 3,20-bis-(alkylene ketal) recovered from the organic layer by evaporation. Recrystallization from organic solvents such as methanol, ethanol, Skellysolve B hexanes, heptanes, benzene, toluene, or the like, provides pure 5α,6α-oxidoallopregnane-3,20-dione 3,20-bis-(alkylene ketal).

The thus obtained 5α,6α-oxidoallopregnane-3,20-dione 3,20-bis-(alkylene ketal), dissolved in a suitable organic solvent, such as tetrahydrofuran, benzene, toluene, ethyl ether, propyl ether, or the like, with the higher boiling solvents such as tetrahydrofuran and benzene preferred, is reacted with a methyl metal compound, especially a methyl metal halide compound such as methyl magnesium chloride, bromide, or iodide, methyl lithium, dimethyl cadmium, or the like. Other organometallic agents which can be used include the ethyl, propyl, butyl, pentyl, hexyl, phenyl, benzyl magnesium chloride, sodium or potassium compound, the phenyl calcium iodide, the alkyl cadmium halides and dialkyl cadmium compounds wherein the alkyl group has from one to six carbon atoms, and the like, with the methyl magnesium bromide and methyl magnesium iodide preferred. In the preferred embodiment of the instant invention this reaction is started at room temperature or below, temperatures between zero and thirty degrees centigrade being preferred. After the addition of the methyl magnesium halide or other methyl metal halides, the temperature is raised and the reaction mixture is heated to about reflux temperature for a period of from one to 48 hours. In general, a large excess of the Grignard reagent (ten to 500 mole equivalents) is used. The temperature for the Grignard addition reaction is generally between 25 to 100 degrees centigrade, with the preferred range of from sixty degrees centigrade to the reflux temperature of the mixture.

After the reaction is terminated, the reaction product is decomposed using neutral conditions. In the preferred embodiment of the invention, the reaction product is decomposed by mixing the reaction mixture with an aqueous saturated ammonium chloride solution, cooled with ice, and the resulting mixture is stirred for a period of several minutes to one hour. The aqueous and organic layers are then separated from each other. The organic phase is washed, dried and evaporated to give the crude 5α-hydroxy-6β-methylallopregnane-3,20-dione, 3,20-bis-(alkylene ketal), which can be purified by conventional procedures, such as recrystallization and/or chromatography with organic solvents, as deemed necessary.

The thus obtained 5α-hydroxy-6β-methylallopregnane-3,20-dione 3,20-bis-(alkylene ketal) is thereupon hydrolyzed in a water-miscible solvent, preferably in an equeous-alkanol or acetone acidic medium. As solvent alkanols, methanol and ethanol are the preferred alkanols, however, other suitable water-miscible solvents such as tertiary butyl alcohol, propyl alcohol, isopropyl alcohol, dioxane, acetone, or the like may be used. To the solution of the steroid is then added an organic or inorganic acid, preferably a mineral acid such as sulfuric acid or hydrochloric acid; but also organic acids such as formic, acetic, propionic, and toluenesulfonic, may be used. The thus obtained mixture is preferably refluxed to accelerate the hydrolysis, then neutralized with sodium bicarbonate, sodium carbonate, potassium carbonate, sodium hydroxide, or other alkali solutions, and concentrated to give a crude product consisting of 5α-hydroxy-6β-methylallopregnane-3,20-dione. The crude product can be purified using known techniques such as by recrystallization from organic solvents such as acetone, ethyl acetate Skellysolve B hexanes, methanol, tertiary butyl alcohol, ether, or the like, or mixtures thereof to give pure 5α-hydroxy-6β-methylallopregnane-3,20-dione.

The thus obtained 5α-hydroxy-6β-methylallopregnane-3,20-dione is thereupon dehydrated. Dehydration can be effected in alkali solution or in acidic solution and preferably in the presence of a nitrogen or other inert atmosphere. In the preferred embodiment of the present invention alkali dehydration is used. The steroid is dissolved in methanol, ethanol, dioxane, or other convenient solvents unreactive to the base employed, and the solution purged of oxygen by bubbling nitrogen through the solution, and reacted with an oxygen-free alkali metal base solution. Sodium or potassium hydroxide are the preferred bases; however, alkali metal alkoxides, barium hydroxide, calcium hydroxide, or the like, are operative. The alkaline mixture is then allowed to stand in a nitrogen atmosphere for a period of from four to 48 hours at a temperature between fifteen and forty degrees centigrade to give 6β-methyl-4-pregnene-3,20-dione (6β-methylprogesterone). To isolate this 6-methyl steroid, the mixture is acidified, illustratively with acetic acid and the mixture is thereupon concentrated and finally evaporated to dryness. The resulting residue is recrystallized from suitable organic solvents such as acetone, Skellysolve B-hexanes, heptanes, ethanol, methanol, tertiary butyl alcohol, dioxane, ether, acetone, or the like, to give the pure 6β-methylprogesterone.

Dehydration can also be carried out by reacting the 5α-hydroxy-6β-methylallopregnane-3,20-dione with an acid, or with thionyl chloride in pyridine solution to give the corresponding 6-methyl-4-pregnene-3,20-dione.

Instead of the instant steps of (1) decomposing the metal (Grignard) steroid complex in a neutral solution, (2) hydrolyzing to remove the ketal groups and (3) dehydrating to establish a 4(5)-double bond, the metal steroid complex in the original solution may be decomposed, hydrolyzed and dehydrated in one step by the addition of acid, illustratively dilute aqueous sulfuric acid or aqueous alcoholic acid solution. Temperatures between fifteen to forty degrees and a reaction time between six hours to three days depending on the temperatures employed are useful in this one-step procedure to produce 6β-methyl-4-pregnene-3,20-diones from the corresponding metal complex of 6β-methyl-5α-hydroxyallopregnane-3,20-dione.

Usage of large amounts of enolyzing agents, strong mineral acids or strong alkali metal bases, produce in the dehydration of 5α-hydroxy-6β-methylallopregnane-3,20dione a certain amount of epimerization resulting in mixtures of both the 6α- and the 6β-methylprogesterones. Similarly 6β-methylprogesterone can be converted by acids or base to the 6α-methylprogesterone as shown in Example 5A.

The following preparations and examples are illustrative of the product and the process of the present invention and are not to be construed as limiting.

PREPARATION 1

Progesterone 3,20-bis-(ethylene ketal)

A solution was prepared containing 62.5 grams of progesterone in 3000 milliliters of benzene and 160 milliliters of ethylene glycol. This solution was refluxed in the presence of a Dean-Stark water trap to remove water present in the reagent. Thereafter six grams of paratoluene-sulfonic acid was added and refluxed for six hours using a calcium carbide water trap to remove the water formed in the reaction. After this period of reflux the solution was cooled and water was added. The aqueous layer was separated and washed with ether and the ether extracts added to the organic layer. The total organic layers were then successively washed with sodium bicarbonate solution, saturated sodium chloride solution, water and then dried with sodium sulfate. The solvents were removed by distillation and the thus obtained residue which still contained unreacted progesterone as shown by papergram analysis was subjected a second time to the ketalization reaction above using with the crude residue 2000 milliliters of benzene, 100 milliliters of ethylene glycol, and four grams of para-toluenesulfonic acid. A second ketalization reaction was carried out with a reflux period of five hours and the reaction mixture then worked up as before. The crude product was recrystallized from methanol-methylene chloride to give 31.8 grams of progesterone 3,20-bis(ethylene diketal) of melting point 175 to 180.

PREPARATION 2

Progesterone 3,20-bis(propylene ketal)

In the same manner as shown in Preparation 1, progesterone dissolved in benzene and propylene glycol was heated to reflux in the presence of para-toluenesulfonic acid for a period of eighteen hours to give progesterone 3,20-bis-(propylene ketal).

In the same manner as shown in Preparations 1 and 2, other progesterone 3,20-bis-(alkylene ketals) are prepared by reacting at reflux temperature solutions of progesterone in benzene, toluene, hexane, heptane, or other inert organic solvents with 1,2-alkane diols or 1,3-alkane diols such as butane-1,2-diol, butane-1,3-diol, pentane-1,2- and 1,3-diol, hexane-1,2- and 1,3-diol, heptane-1,2- and 1,3-diol, octane-1,2- and 1,3-diol, or other alkane diols of the formula:

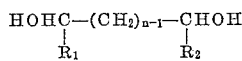

wherein $n$ is an integer having a value from one to two, inclusive, and $R_1$ and $R_2$ are selected from the group consisting of hydrogen and lower alkyl radicals containing up to six carbon atoms and wherein the total number of carbon atoms in the alkane diol is up to and including eight carbon atoms, in the presence of a strong acid such as toluenesulfonic acid, ortho-chlorobenzenesulfonic acid, sulfuric acid, and the like, to obtain the corresponding progesterone 3,20-bis-(alkylene ketal). Representative such progesterone bis-(alkylene ketals) prepared include the progesterone 3,20-bis-(1,3-propylene ketal), 1,2- and 1,3-butylene diketal, 1,2-, 1,3- and 3,4-pentylene diketal, and the like.

EXAMPLE 1

5α,6α-oxidopregnane-3,20-dione 3,20-bis-(ethylene ketal)

A solution was prepared containing ten grams of progesterone 3,20-bis-(ethylene ketal) in 222.5 milliliters of chloroform. This solution was cooled to zero to five degrees centigrade in an ice bath and thereto was added a mixture of 22.25 milliliters of forty percent peracetic acid and 2.23 grams of anhydrous sodium acetate. The mixture was thereupon stirred for a period of two hours at zero to five degrees centigrade and the aqueous layer was then separated. The chloroform layer was diluted with 205 milliliters of chloroform and washed with three 176-milliliter portions of saturated sodium bicarbonate solution, then with two 176-milliliter portions of water and dried over anhydrous sodium sulfate. The solution was thereupon evaporated at reduced pressure to leave a solid residue which was twice recrystallized from acetone to give 3.61 grams of 5α,6α-oxidopregnane-3,20-dione 3,20-bis-(ethylene ketal) of melting point 185 to 187 degrees centigrade.

*Analysis.*—Calcd. for $C_{25}H_{38}O_5$: C, 71.74; H, 9.15. Found: C, 71.73; H, 9.18.

The crystallization liquor remaining contained 5β,6β-oxidopregnane-3,20-dione 3,20-bis-(ethylene ketal) which was obtained by further evaporation of the liquors of crystallization and recrystallizing the thus obtained precipitate several times from acetone-Skellysolve B. The melting point of 5β,6β-oxidopregnane-3,20-dione 3,20-bis-(ethylene ketal) was 160 to 167 degrees centigrade.

In the same manner 5α,6α-oxidoallopregnane-3,20-dione 3,20-bis-(ethylene ketal) is obtained by substituting performic acid or perbenzoic acid for the peracetic acid in the foregoing example.

EXAMPLE 2

5α,6α-oxidoallopregnane-3,20-dione 3,20-bis-(propylene ketal)

In the same manner as shown in Example 1, reacting progesterone 3,20-bis-(propylene ketal) with peracetic acid and anhydrous sodium acetate in chloroform solution produced 5α,6α-oxidopregnane-3,20-dione 3,20-bis-(propylene ketal).

In the same manner as shown in Examples 1 and 2, other 5α,6α-oxidopregnane-3,20-dione 3,20-bis-(ketals) are prepared by reacting the corresponding progesterone bisketal with a peracid, such as performic, peracetic, perpropionic, perbenzoic, monoperphthalic acid at low temperatures usually between minus ten and plus ten degrees centigrade. Representative compounds thus prepared comprise 5α,6α-oxidoallopregnane-3,20-dione 3,20-bis-(1,3-propylene ketal), 5α,6α-oxdiopregenane-3,20-dione 3,20-bis-(1,2-butylene ketal), the 2,3- and the 1,3-butylene ketals of 5α,6α-oxidoallopregnene-3,20-dione, the 1,2-, 2,3-, 2,4- and 3,5-pentylene ketals and the 1,2-, 1,3-hexylene, 1,2-, 1,3-heptylene, 1,2-, 1,3-octylene ketals of 5α,6α-oxidoallopregnane-3,20-dione, and the like.

EXAMPLE 3

5α-hydroxy-6β-methylpregnane-3,20-dione

A solution of 5α,6α-oxidopregnane-3,20-dione 3,20-bis-(ethylene ketal) in 150 milliliters of tetrahydrofuran (previously distilled over sodium hydroxide) was added to 40.5 milliliters of three-molar ethereal methyl magnesium bromide solution. A clear solution resulted which was refluxed for a period of six hours. A precipitate appeared after about one hour of reflux. The mixture was thereupon cooled, 25 milliliters of saturated ammonium chloride solution was added and the layers separated. The aqueous layer was washed with ether and then added to the organic layer which layer was washed with saturated ammonium chloride, then water, one normal sodium hydroxide, saturated sodium chloride, water again, and then dried over anhydrous sodium sulfate. The thus-obtained solution was evaporated in vacuo leaving a solid residue which was redissolved in sixty milliliters of acetone and thereto was added six milliliters of one normal sulfuric acid. This mixture was refluxed for a period of ten minutes and thereafter cooled and refrigerated for a period of two hours, filtered, and the precipitate thus collected washed with acetone and water. The crude 5α-hydroxy-6β-methylallopregnane-3,20-dione (2.448 grams) was recrystallized from acetone methylene chloride to give 5α-hydroxy-6β-methylallopregnane-3,20-dione of melting point 222 to 233 degrees centigrade and rotation [α]$_D$ plus 172 degrees in chloroform.

Analysis.—Clcd. for $C_{22}H_{34}O_3$: C, 7626; H, 9.89. Found: C, 76.24; H, 9.47.

EXAMPLE 4

*5α-hydroxy-6β-methylallopregnane-3,20-dione from 5α,6α-oxidoallopregnane-3,20-dione 3,20-bis-(propylene ketal)*

In the same manner as shown in Example 3, treating a solution of 5α,6α-oxidoallopregnane-3,20-dione 3,20-bis-(propylene ketal) in benzene solution with methyl magnesium iodide in ether resulted in 5α-hydroxy-6β-methylallopregnane-3,20-dione 3,20-bis-(propylene ketal) which can be hydrolyzed with dilute sulfuric acid to give 5α-hydroxy-6β-methylallopregnane-3,20-dione.

In the same manner as shown in Examples 3 and 4, other bis-ketals when reacted with methyl magnesium bromide or iodide in solution such as tetrahydrofuran, benzene, ether, or mixtures thereof, or the like, give the corresponding 5α-hydroxy-6β-methylallopregnane-3,20-dione 3,20-bis-ketals which can be hydrolyzed with a dilute acid such as dilute sulfuric, dilute hydrochloric acid or other acids to give 5α-hydroxy-6β-methylallopregnane-3,20-dione.

In the same manner as shown in Examples 3 and 4, reacting 5α,6α-oxidoallopregnane-3,20-dione 3,20-bis-(alkylene ketals) with alkyl magnesium halides, such as ethyl, propyl, isopropyl, butyl, isobutyl, pentyl, hexyl, magnesium iodide or magnesium bromide or the like or an aryl magnesium halide such as phenyl magnesium iodide and hydrolyzing with a dilute acid the thus obtained 5α-hydroxy-6β-alkyl- or respectively 5α-alkyl-6β-arylallopregnane-3,20-dione 3,20-bis-(alkylene ketal) yields the corresponding 5α-hydroxy-6β-alkyl- or 5α-hydroxy-6β-arylallopregnane-3,20-dione wherein the alkyl group may be ethyl, propyl, isopropyl, butyl, isobutyl, pentyl, hexyl, or the like, and the aryl group may be phenyl or the like.

EXAMPLE 5

*6β-methylprogesterone*

A solution was prepared of 2.45 grams of 5α-hydroxy-6β-methylallopregnane-3,20-dione in 430 milliliters of hot ethanol. The solution was cooled to thirty degrees centigrade in a nitrogen atmosphere. While the resulting precipitate was beginning to form, 22 milliliters of 0.1 normal sodium hydroxide solution (purged with nitrogen) was added and the resulting slurry of crystals was stirred for a period of sixteen hours at room temperature. Thereafter one milliliter of acetic acid was added and the solvents removed at reduced pressure. The crystalline residue was dissolved in ethyl acetate, the solution thus obtained washed with sodium bicarbonate solution, then with saturated sodium chloride, then with water, and then dried over anhydrous sodium sulfate and concentrated to a small volume. Thereupon Skellysolve B hexanes was added and the solution refrigerated overnight at zero to five degrees centrigrade. The thus obtained crude crystals of 6β-methyl-4-pregnene-3,20-dione were recovered by filtration, washed with ethyl acetate-Skellysolve B hexanes and dried. The crude product was recrystallized from ethyl acetate-Skellysolve B hexanes to give 750 milligrams of 6β-methyl-4-pregnene-3,20-dione of melting point 172 to 174 degrees centigrade.

Analysis.—Calcd. for $C_{22}H_{32}O_2$: C, 80.44; H, 9.82. Found: C, 80.49; H, 9.85.

In the same manner given in Example 5, treating at reflux temperature other 5α-hydroxy-6β-alkyl- or 5α-hydroxy-6β-arylallopregnane-3,20-dione with a base, such as sodium or potassium hydroxide, dissolved in aqueous ethanol, produces 6β-alkyl and 6β-arylprogesterone such as, for example, 6β-ethylprogesterone, 6β-propylprogesterone, 6β-isopropylprogresterone, 6β-butylprogesterone, 6β-isobutylprogresterone, 6β-pentylprogesterone, 6β-hexylprogesterone, 6β-phenylprogesterone, or the like.

EXAMPLE 5A

*6α-methylprogesterone*

A mixture of two grams of 6β-methylprogesterone of melting point 172–173 degrees, seventy milliliters of methanol, and ten milliliters of 2 Normal sulfuric acid was refluxed for one hour. The mixture was cooled, neutralized with sodium bicarbonate solution, and the methanol was largely removed at reduced pressure. The addition of more water to the residual slurry dissolved the precipitated sodium sulfate and left a crystalline precipitate of crude product, which was filtered, washed with water and dried, weight 1.907 grams, melting point 105–115 degrees. This material was chromatographed on 200 grams of Florisil magnesium silicate. Elution with five percent and eight percent acetone in Skellysolve B hexanes gave a series of crystalline fractions, all melting in the range 100–115 degrees. These were combined and recrystallized from methylene chloride-Skellysolve B hexanes to give colorless plates of 6α-methylprogesterone, melting point 116 to 119 degrees, weight 1.550 grams.

EXAMPLE 5B

*6α-methylprogesterone from 6β-methylprogesterone*

A solution was prepared containing 0.5 gram of 6β-methylprogesterone dissolved in a mixture of 75 milliliters of methanol, five milliliters of water and two milliliters of concentrated sulfuric acid at room temperature. This reaction mixture was allowed to stand overnight (twenty hours) and was then neutralized by the addition of 0.1 Normal sodium hydroxide solution. The thus-obtained neutral solution was then diluted with 300 milliliters of water and extracted with three 150-milliliter portions of methylene chloride. The methylene chloride extracts were combined, washed twice with water, dried over anhydrous sodium sulfate, evaporated to leave a residue which was three times recrystallized from acetone Skellysolve B hexanes to give 6α-methylprogesterone of the same melting point as in Example 5A.

EXAMPLE 6

*6α-methylhydrocortisone from 6β-methylprogesterone*

(A) 6-METHYL-11α-HYDROXYPROGESTERONE

A medium was prepared containing ten grams of Cerelose dextrose technical grade and twenty grams of corn steep liquor (sixty percent solids) in sufficient tap water to make up one liter of solution. One hundred liters of such a medium was adjusted by the addition of 25 percent sodium hydroxide solution to a pH of 5. Thereto was then added 400 milliliters of lard oil and lard-oil octadecanol as an anti-foaming agent. This medium was sterilized for 45 minutes at twenty pounds pressure and inoculated with *Rhizopus nigricans* minus strain, American Type Culture Collection No. 6227b, and incubated for 24 hours at a temperature of 28 degrees centigrade using a rate of aeration and stirring such that the oxygen uptake was 6.3 to seven millimoles per hour per milliliter of sodium sulfite according to the method of Cooper, Fernstrom and Miller, Ind. Eng. Chem. 36, 504 (1944). To this medium containing a 24 hour growth of *Rhizopus nigricans* minus strain was added six grams of 6β-methylprogesterone in 150 milliliters of acetone to provide a suspension of the steroid in the culture. After an additional 24 hour period of incubation under the same conditions of temperature and aeration, the beer and mycelium were extracted. The mycelium was filtered, washed twice each time with a volume of acetone approximately equal to the volume of the mycelium, and extracted twice, each time with a volume of methylene chloride approximately equal to the volume of the mycelium. The acetone and methylene chloride extracts including solvents were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride extracts with about three to five grams of anhydrous sodium sulfate per liter of solvent and filtering, the solvent was removed by distillation. The residue was dissolved in a minimum of methylene chloride, filtered and the solvent then evaporated. The crude product, 6-methyl-11α-hydroxyprogesterone, thus obtained was in an oily form which failed to crystallize despite various attempts to attain a pure product and was therefore used in its oily form for the next step, that is oxidation to 6β-methyl-11-ketoprogesterone.

(B) 6β-METHYL-11-KETOPROGESTERONE

A solution was prepared containing 3.5 grams of the crude 6β-methyl-11α-hydroxyprogesterone in 240 milliliters of acetic acid at room temperature. Thereto was added dropwise a solution of 0.82 gram of chromium trioxide in 82 milliliters of acetic acid and 0.8 milliliter of water. During the addition the temperature was maintained between twenty to 23 degrees centigrade and thereafter for another period of one and one-half hours. The reaction mixture was then diluted with one liter of water and extracted with six 150-milliliter portions of methylene chloride. The extracts were combined, washed with dilute sodium bicarbonate solution and water, dried over anhydrous sodium sulfate and evaporated to dryness under reduced pressure. The thus obtained solid, crude 6-methyl-11-ketoprogesterone was recrystallized from methanol to give 2.75 grams of 6β-methyl-11-ketoprogesterone of melting point 170 to 177. An analytical sample was prepared by subsequent recrystallization from methanol which was pure 6β-methyl-11-ketoprogesterone of melting point 172.5 to 175 degrees and rotation $[\alpha]_D$ plus 203 degrees in chloroform.

*Analysis.*—Calcd. for $C_{22}H_{30}O_3$: C, 77.15; H, 8.83. Found: C, 77.32; H, 8.47.

(C) 6-METHYL-3,11-DIKETO-4,17(20)-PREGNADIENE-21-OIC ACID METHYL ESTER

A solution of 6.84 grams (0.02 mole) of 6-methyl-11-ketoprogesterone in seventy milliliters of tertiary butyl alcohol was prepared by heating to 55–60 degrees with stirring under a nitrogen atmosphere. While the temperature was held at this point 11.7 grams of ethyl oxalate was added. Thereafter 2.7 grams of sodium methoxide in methanol (commercial 25% solution) was added. Almost immediately the yellow precipitate of the sodium enolate of 6-methyl-21-ethoxyoxalyl-11-ketoprogesterone began to precipitate. The temperature was maintained at fifty to sixty degrees centigrade for fifty minutes after which the mixture was allowed to cool slowly to approximately 35 degrees centigrade in the next fifteen minutes.

A solution of 2.44 grams of anhydrous sodium acetate and 3.00 grams of glacial acetic acid in 160 milliliters of methanol which had been previously cooled to ten degrees centigrade was then added and the mixture stirred until solution was achieved. The yellow solution was cooled to zero degrees and treated dropwise with vigorous stirring with a pre-cooled (to zero degrees centigrade) solution of 9.6 grams of bromine in 96 milliliters of methanol. Approximately 75 milliliters of the bromine solution was added at a constant rate during ten minutes. The rate of addition was then decreased and the remaining 21 milliliters added during the following ten minutes. After an additional ten minutes stirring period, the bromine color had essentially disappeared.

With continuous stirring and cooling a solution of 5.57 grams of sodium methoxide in methanol (commercial 25 percent solution) was added rapidly. A bright orange color developed which soon faded to yellow amber. The cooling bath was removed, the temperature raised to 25–30 degrees centigrade and the solution stirred for 1.5 hours. During this period crystallization occurred, the precipitated material being the 2-bromo-6-methyl-3,11-diketo-4,17(20)-pregnadiene-21-oic acid methyl ester.

Sixteen milliliters of acetic acid and 3.2 grams of zinc dust was added to this material and stirring continued for a period of thirty minutes. The excess zinc dust was removed by filtration and washed with fifteen to twenty milliliters of fresh methanol. The combined filtrate was concentrated at reduced pressure in a sixty-degree water bath to approximately a 200-milliliter volume. The concentrate was poured slowly with stirring into 750 milliliters of ice and water. The mixture was refrigerated for fifteen minutes and then filtered. The filter cake was washed with 100 milliliters of cold water and dried at room temperature. The slightly gummy crude product, 6-methyl-3,11-diketo-4,17(20)-pregnadiene-21-oic acid methyl ester weighed 7.02 grams (94.8% yield).

1.5 gram portions of the crude material was dissolved in fifty milliliters of benzene and poured onto a chromatographic column, previously charged with 75 grams of Florisil synthetic magnesium silicate. The column was eluted with 750 milliliters of five percent acetone—95 percent Skellysolve B hexane, 1200 milliliters of eight percent acetone-92 percent Skellysolve B hexane, 300 milliliters of twelve percent acetone-88 percent Skellysolve B hexane, and 150 milliliters of 100 percent acetone. The eluate was collected in 150-milliliter fractions and evaporated. Fractions 5–10, inclusive, contained 939 milligrams of crystalline product which was recrystallized from methanol to give 660 milligrams of white needles of pure 6-methyl-3,11-diketo-4,17(20)-pregnadiene-21-oic acid methyl ester of melting point 227–229 degrees centigrade, $[\alpha]_D$ plus 131 degrees in chloroform (95 percent ethanol), $$\lambda_{max.}^{ethanol} \ 234 \ \text{millimicrons.}$$

*Analysis.*—Calcd. for $C_{23}H_{30}O_4$: C, 74.56; H, 8.16. Found: C, 74.65; H, 8.12.

(D) 6-METHYL-3,11-DIKETO-4,17(20)-PREGNADIEN-21-OIC ACID METHYL ESTER 3-PYRROLIDINE ENAMINE

A solution of 0.5 gram of 6-methyl-3,11-diketo-4,17(20)-pregnadien-21-oate methyl ester, 0.5 milliliter of pyrrolidine, forty milliliters of benzene and twenty milligrams of paratoluenesulfonic acid was heated under reflux for one hour. The solvent was distilled under vacuum. Trituration of the residue with methanol gave 398 milligrams of a yellow solid (68.2 percent yield) of the 3-pyrrolidine enamine of 6-methyl-3,11-diketo-4,17(20)-pregnadien-21-oic acid methyl ester of melting point 136–148 degrees centigrade and $$\lambda_{max.}^{5\% \ HCl-MeOH} \ 273 \ \text{millimicrons}$$

$a_M$=22,950, 224 millimicrons, $a_M$=16,825, 360 millimicrons, $a_M$=1,950.

Analysis.—Calcd. for $C_{27}H_{37}NO_3$: C, 76.56; H, 8.81; N, 3.31. Found: C, 76.42; H, 9.02; N, 3.37.

(E) 3-PYRROLIDINE ENAMINE OF 6-METHYL-11β,21-DIHYDROXY-4,17(20)-PREGNADIEN-3-ONE

To a suspension of 1.1 grams of lithium aluminum hydride in 75 milliliters of anhydrous ether was added 1.3 grams of the crude 3-pyrrolidine enamine of 6-methyl-11β,21-dihydroxy-4,17(20)-pregnadien-21-oic acid methyl ester. The reaction mixture was heated under reflux for one hour. The excess lithium aluminum hydride was destroyed by the addition of ethyl acetate. Water was added until a pasty mass of lithium salts were formed. The supernatant liquid was decanted and evaporated yielding 1.17 grams of a yellow oil consisting essentially of the 3-enamine of 6-methyl-11β,21-dihydroxy-4,17(20)-pregnadien-3-one.

(F) 6-METHYL-11β,21-DIHYDROXY-4,17(20)-PREGNADIEN-3-ONE

The yellow oil consisting of impure 3-enamine of 6-methyl-11β-21-dihydroxy-4,17(20) - pregnadien - 3 - one was dissolved in twenty milliliters of methanol containing two milliliters of five percent sodium hydroxide. After 1.5 hours at 26 degrees the solution was neutralized with acetic acid, and the crude product, 1.13 grams, was obtained by extraction after distillation of the methanol. This material was chromatographed over Florisil and a fraction of 306 milligrams, obtained by elution with Skellysolve B and acetone containing twenty percent acetone, was recrystallized from ethyl acetate to give 240 milligrams of 6-methyl-11β,21-dihydroxy-4,17(20)-pregnadiene-3-one of melting point 172–174 degrees centigrade.

The analytical sample was recrystallized from ethyl acetate having a melting point of 178–179 degrees and rotation $[\alpha]_D$ 127 degrees in chloroform.

Analysis.—Calcd. for $C_{22}H_{32}O_2$: C, 76.70; H, 9.36. Found: C, 76.98; H, 9.69.

(G) 6-METHYL-11β-HYDROXY-21-ACETOXY-4,17(20)-PREGNADIEN-3-ONE

A solution of 100 milligrams of 6-methyl-11β,21-dihydroxy-4,17(20)-pregnadien-3-one in one milliliter of pridine was mixed with one milliliter of acetic anhydride and the while was then maintained at room temperature for a period of seventeen hours, whereafter crushed ice was added thereto. The oily precipitate, 6-methyl-11β-hydroxy-21-acetoxy-4,17(20) - pregnadien-3-one, was extracted with three ten-milliliter portions of methylene chloride, the methylene chloride extracts dried over anhydrous sodium sulfate and evaporated to give 111 milligrams of 6-methyl-11β - hydroxy - 21 - acetoxy-4,17(20)-pregnadien-3-one. The product recrystallized from ethyl acetate plus Skellysolve B and melted at 136–139 degrees, rotation $[\alpha]_D$ plus 128 degrees in chloroform.

Analysis.—Calcd. for $C_{24}H_{34}O_4$: C, 74.57; H, 8.87. Found: C, 74.69; H, 8.94.

(H) 6α-METHYLHYDROCORTISONE ACETATE 100 milligrams of oily 6-methyl-11β-hydroxy-21-acetoxy-4,17(20)-pregnadien-3-one were dissolved in six milliliters of tertiary butyl alcohol and 0.05 milliliter of pyridine. To this mixture was added 1.6 milligrams of osmium tetroxide and 0.21 milliliter of N-methylmorpholine oxide peroxide (equal to 35.8 milliliters of a tenth normal sodium thiosulfate solution). After stirring at 26 degrees centigrade for a period of two hours, excess sodium hydrosulfite solution was added. The solvent was distilled on a vacuum and the product extracted with methylene dichloride. The material was chromatographed over Florisil anhydrous magnesium sulfate and the fraction consisting of Skellysolve B hexanes with fifteen percent acetone were separated, evaporated to give 52 milligrams of crystalline 6α-methylhydrocortisone acetate of melting point 213–214 degrees centigrade.

Analysis.—Calcd. for $C_{24}H_{34}O_6$: C, 68.87; H, 8.19. Found: C, 68.60; H, 8.41.

(I) 6α-METHYL-11β,17α,21-TRIHYDROXY-4-PREGNENE-3,20-DIONE (6α-METHYLHYDROCORTISONE)

A solution was prepared containing 0.5 gram of 6α-methyl - 11β,17α - dihydroxy - 21 - acetoxy - 4 - pregnene-3,20-dione in 25 milliliters of methanol. This solution was purged with oxygen free nitrogen for a period of five minutes and thereafter was added a similarly oxygen purged solution of 0.250 gram of potassium bicarbonate, dissolved in one milliliter of methanol and one milliliter of water. The mixture was allowed to stand for three hours in a nitrogen atmosphere, then neutralized with hydrochloric acid, poured into 200 milliliters of ice water and the thus obtained mixture extracted with four portions of fifty milliliters of methylene chloride. The methylene chloride extracts were combined, washed several times with water, dried over anhydrous sodium sulfate and evaporated to give 6-methylhydrocortisone which was recrystallized three times from methanol and water to give pure 6α-methylhydrocortisone of melting point 203 to 208 degrees centigrade.

(J) 6α-METHYLHYDROCORTISONE BENZOATE

A mixture of 500 milligrams of 6α-methylhydrocortisone, five milliliters of pyridine and five milliliters of benzoyl chloride was allowed to stand at room temperature for a period of eight hours. Thereafter the mixture was poured into excess of water, the water extracts neutralized with sodium bicarbonate and thereupon the mixture refrigerated. The mixture was then filtered and the thus obtained 6α-methylhydrocortisone benzoate recrystallized from methanol to give pure 6α-methylhydrocortisone benzoate.

In the same manner as given above, treating in pyridine solution:

(α) 6α-methylhydrocortisone with propionic anhydride yielded 6α-methylhydrocortisone 21-propionate.
(β) 6α - methylhydrocortisone with butyric anhydride yielded 6α-methylhydrocortisone 21-butyrate.

(K) 6α-METHYLCORTISONE

To 760 milligrams (2.02 millimoles) of 6α-methylhydrocortisone (6α - methyl - 11β,17α,21-trihydroxy-4-pregnene-3,20-dione) in 32 milliliters of methanol was added 0.67 milliliter of pyridine, 1.34 milliliters of water and 560 milligrams (4.04 millimoles) of N-bromoacetamide. The reaction mixture was held at twelve degrees centigrade overnight when titration of an aliquot indicated that approximately 1.1 mole equivalents of oxidant had been used. At this time sixty milliliters of a dilute solution of sodium sulfite (containing 400 milligrams of sodium sulfite) was added to destroy excess N-bromoacetamide and the mixture was concentrated under reduced pressure to about 55 mililiters until copious crystallization occurred. The mixture was cooled to zero degrees centigrade, maintained at this temperature for three hours and filtered to yield 610 milligrams of 6α-methylcortisone.

Since the product gave a positive Beilstein test, it was dissolved in 36 milliliters of acetic acid and treated with 1.2 grams of powdered zinc at room temperature for two hours. The mixture was filtered and the filtrate concentrated to ten milliliters under reduced pressure. The addition of fifty milliliters of water caused crystallization. The crystals were filtered off and washed with water and dried to yield 360 milligrams of 6α-methylcortisone of melting point 207–207.5. Recrystallization from acetone gave 230 milligrams of melting point 212.5–215 degrees.

The infrared absorption spectrum of 6α-methylcortisone in Nujol mineral oil is as follows:

| | | |
|---|---|---|
| OH_____cm.⁻¹__ | 3,400 | 3,305 |
| 11- and 20-keto_____cm.⁻¹__ | 1,717 | 1,700 |
| Conjugated 3-keto_____cm.⁻¹__ | 1,652 | |
| Δ⁴-double bond_____cm.⁻¹__ | 1,604 | |

EXAMPLE 7

*6α-methyldesoxycorticosterone*

To a solution of one gram of 6α-methylprogesterone in twenty milliliters of tertiary butyl alcohol was added at seventy degrees centigrade in an atmosphere of nitrogen and with stirring, two grams of ethyl oxalate. The temperature was permitted to drop to 55 degrees and 0.5 gram of sodium methoxide in two milliliters of dry methanol was added. The resulting pasty yellow suspension was stirred for fifteen minutes in an atmosphere of nitrogen. A cooled solution of 0.5 gram of acetic acid in 25 milliliters of methanol was added to the suspension of the thus produced sodium dienolate of 2,21-bis-(ethoxyoxalyl)-6-methylprogesterone to produce a solution of the dienol in the presence of an excess of sodium acetate. A solution of one gram of iodine in twenty milliliters of methanol was added. The solution was maintained at room temperature for two and one-half hours while stirring was continued under nitrogen to give 2,21-bis-(ethoxyoxalyl)-6α-methyl-21-iodoprogesterone.

To the resulting solution of 2,21bis-(ethoxyoxalyl)-6-methyl-21-iodoprogesterone was added 6.5 grams of anhydrous potassium acetate and the solution was kept at room temperature for 24 hours. There was thus produced a solution of 2-ethoxyoxalyl-6-methyl-21-acetoxyprogesterone, resulting from the acetylation of the intermediately produced 2-ethoxyoxalyl-6-methyl-21-iodoprogesterone.

The solution of 2-ethoxyoxalyl-6-methyl-21-acetoxyprogesterone was poured into 300 milliliters of ice water containing 0.8 gram of sodium thiosulfate and seven milliliters of five normal sulfuric acid. The precipitated yellow crude 2-ethoxyoxalyl-6-methyl-21-acetoxyprogesterone was filtered, washed with water, and dried. There was thus obtained approximately 1.2 grams of crude product which gave a negative Beilstein test for halogen and a positive ferric chloride test for enols.

The thus isolated 2-ethoxyoxalyl-6α-methyl-21-acetoxyprogesterone was dissolved in twenty milliliters of methanol containing one gram of anhydrous sodium acetate. To the resulting deep red brown solution, cooled to about zero degrees centigrade, there was slowly added a solution of 0.42 gram of bromine in four milliliters of methanol. This solution containing 2-bromo-2-ethoxyoxalyl-6-methyl-21-acetoxyprogesterone was then mixed with a solution of 0.14 gram of sodium methoxide in 0.6 milliliter of methanol and was stirred for one hour as the temperature of the solution was permited to rise to room temperature.

The thus produced reaction product containing 2-bromo-6α-methyl-21-acetoxyprogesterone was mixed with 1.4 milliliters of glacial acetic acid and 0.6 gram of zinc dust for one hour with vigorous stirring to produce 6-methyl-21-acetoxyprogesterone (6-methyldesoxycorticosterone 21-acetate). The resulting solution was filtered and the filtrate was poured into 150 milliliters of ice water. The resulting white precipitate was filtered and dried to yield crude 6-methyl-21-acetoxyprogesterone which was chromatographed over fifty grams of Florisil magnesium silicate. The column was developed with ten fractions of Skellysolve B hexane hydrocarbons containing ten percent acetone and ten fractions of Skellysolve B containing twenty percent acetone. The fractions containing twenty percent acetone were combined and the solvent distilled to give 6α-methyl-21-acetoxyprogesterone.

A solution was prepared containing one gram of 6α-methyl-21-acetoxyprogesterone, dissolved in 25 milliliters of methanol and two milliliters of water. Thereto was added 0.5 gram of potassium hydroxide, dissolved in five milliliters of methanol. The solution was allowed to stand at room temperature for a period of six hours, and then poured into 200 milliliters of ice water and extracted with three 50-milliliter portions of methylene chloride. The methylene chloride extracts were combined, evaporated, and the thus obtained residue recrystallized three times from methanol to give pure 6α-methyldesoxycorticosterone.

EXAMPLE 8

*6α-methyl-21-fluoroprogesterone*

A solution of one gram of 6α-methyldesoxycorticosterone, dissolved in seven milliliters of pyridine was cooled to zero degrees and thereto was added 0.4 milliliter of methanesulfonyl chloride under stirring. The stirring was continued for a period of two hours at zero degrees centigrade whereafter forty milliliters of water was added. The precipitate was collected on a filter paper, washed with water and air-dried to give a white powder of 6α-methyldesoxycorticosterone 21-methanesulfonate.

A solution of one gram of crude 21-methanesulfonate of 6α-methyldesoxycorticosterone, dissolved in twenty milliliters of boiling acetone was treated with one gram of sodium iodide in fifty milliliters of acetone. The mixture was stirred at the boiling point for a period of fifteen minutes and thereupon concentrated to approximately one half volume. After cooling to room temperature, a cold solution of 0.2 gram of sodium thiosulfate in forty milliliters of water was added. The mixture was further chilled to a temperature of about five degrees and then filtered. The ivory-colored, crystalline product 6α-methyl-21-iodo-4-pregnene-3,20-dione was washed with water and dried and thus used without further purification for the preparation of the 21 fluoro analogue.

A solution of 0.8 gram of 6α-methyl-21-iodo-4-pregnene-3,20-dione in 160 milliliters of acetonitrile was prepared by heating to the boiling point. After cooling to fifty degrees centigrade the solution was protected from light and thereto was added 0.6 milliliter of fifty percent aqueous solution of silver fluoride. The solution became coludy and brown colored. Stirring was continued at a temperature between forty to 45 degrees centigrade and silver fluoride was added to the mixture in two one-milliliter portions thirty minutes apart. Thereafter, stirring was continued for a period of two hours. The brown mixture was then filtered through a bed of Celite diatomaceous earth and the filtrate evaporated at reduced pressure from a water-bath at a temperature of fifty degrees centigrade. The brown residue was thoroughly extracted with four 25-milliliter portions of warm methylene chloride, the methylene chloride extracts concentrated to dryness and the thus obtained residue recrystallized four times from acetone Skellysolve B hexanes to give pure 6-methyl-21-fluoroprogesterone.

EXAMPLE 9

*1-dehydro-6-methylprogesterone*

0.7 gram of 6-methylprogesterone was dissolved in 45 milliliters of tertiary butyl alcohol and thereto was added 4.5 milliliters of acetic acid and 240 milligrams of selenium dioxide. The mixture was heated to 75 degrees centigrade and stirred for a period of 24 hours. Thereafter another portion of 240 milligrams of selenium dioxide was added and heating at 75 degrees centigrade and stirring was continued for an additional 24 hours. The mixture was thereupon cooled, filtered to remove the excess selenium dioxide and evaporated. The thus obtained residue was recrystallized four times from acetone Skellysolve B hexane hydrocarbons to give pure 1-dehydro-6-methylprogesterone.

EXAMPLE 10

*1-dehydro-6-methyldesoxycorticosterone (6-methyl-21-hydroxy-1,4-pregnadiene-3,20-dione)*

A mixture of 0.3 gram of dry sodium methoxide, twenty milliliters of anhydrous benzene and 1.4 milliliters of ethyl oxalate was stirred until a clear solution was obtained. 0.5 milliliter of absolute alcohol was added thereto followed by a rapid addition of a solution of 1.65 grams of 1-dehydro-6-methylprogesterone in forty milliliters of anhydrous benzene. The mixture was stirred for a period of two hours at room temperature (approximately 25 degrees centigrade) then 125 milliliters of dry ether was added and the mixture was stirred for an additional 45 hours. The ivory colored sodium enolate of 21-ethoxyoxalyl - 1 - dehydro-6-methyl-progesterone, thus precipitated, was collected on a filter, washed with anhydrous ether, and dried in a vacuum desiccator at reduced pressure.

To a solution of 1.1 grams of the sodium enolate of 21-ethoxyoxalyl-1-dehydro - 6 - methylprogesterone, dissolved in twelve milliliters of methanol, and cooled in an ice bath, was added dropwise, with stirring over a period of approximately one hour, a solution of 0.52 gram of iodine, dissolved in forty milliliters of methanol, while maintaining the reaction temperature between minus fifteen and minus twenty degrees centigrade. The reaction mixture, thus produced, was stirred for eighty minutes at a temperature of about minus fifteen degrees centigrade whereafter 0.6 milliliter of a 3.4 normal methanolic sodium methoxide solution was added thereto. Stirring was continued at zero degrees centigrade for one hour and the thus produced 1-dehydro-6-methyl-21-iodoprogesterone was precipitated by the dropwise addition of 75 milliliters of water to the reaction mixture while maintaining the temperature of the reaction mixture at zero degrees centigrade for the hour required to complete the addition. Ten grams of sodium chloride was then dissolved in the reaction mixture and the product filtered, washed with water and dried in a vacuum desiccator. The thus isolated 21-iodo-1-dehydro-6-methylprogesterone was converted without further purification to the 21-acetoxy-1-dehydro-6-methylprogesterone.

To a freshly prepared mixture composed of ten grams of potassium acetate, six grams of gyacial acetic acid and five milliliters of acetone was added the 21-iodo-1-dehydro-6-methylprogesterone obtained above, dissolved in fifty milliliters of acetone. The mixture was heated under reflux conditions for one hour whereafter the mixture was kept at room temperature for 2.5 days. The precipitated materials were removed by filtration and washed with twelve milliliters of acetone. The filtrate and wash were combined and the acetone removed by evaporation. The residue was extracted with three 25-milliliter portions of warm ethyl acetate which were then combined, washed with dilute sodium thiosulfate solution and water, and finally dried over anhydrous sodium sulfate. The dry ethyl acetate extract was then distilled in vacuo, the residue dissolved in a small portion of benzene and chromatographed. Infrared analysis confirmed the structure of the eluted product as 21-acetoxy-1-dehydro-6-methylprogesterone.

A mixture was prepared containing thirty milliliters of methanol, five milliliters of water and one gram of potassium carbonate. This mixture was purged of oxygen (air) with a stream of oxygen-free nitrogen for five minutes. Thereafter 21-acetoxy-1-dehydro - 6 - methylprogesterone, as obtained above, was added dissolved in ten milliliters of methanol purged of oxygen as before with a stream of oxygen-free nitrogen. The mixture was shaken several times and allowed to stand overnight at about twenty to 25 degrees centigrade. Thereafter the mixture was poured into 300 milliliters of water and the oily precipitate extracted with three 100-milliliter portions of methylene chloride. The methylene chloride extracts were combined, dried over anhydrous sodium sulfate, evaporated and the thus obtained residue three times recrystallized from acetone Shellysolve B hexanes to give pure 1-dehydro-6-methyldesoxycorticosterone.

EXAMPLE 11

*1-dehydro-6-methyl-21-fluoroprogesterone*

A solution of one gram of 1-dehydro-6-methyldesoxycorticosterone, dissolved in eight milliliters of pyridine, was cooled to zero degrees and thereto was added 0.4 milliliter of methanesulfonyl chloride under stirring. The stirring was continued for a period of two hours at zero degrees centigrade whereafter fifty milliliters of water was added. The precipitated product was collected on a filter, washed with water, and air dried to give a white powder of 1-dehydro-6-methyldesoxycorticosterone 21-methanesulfonate.

A solution of one gram of crude 21-methanesulfonate of 1-dehydro-6-methyldesoxycorticosterone in 25 milliliters of boiling acetone was treated with a solution of 1.1 gram of sodium iodide in ten milliliters of acetone. The mixture was stirred at the boiling point for a period of fifteen minutes and thereupon concentrated to approximately one-half volume. After cooling to room temperature, a cold solution of 0.15 gram of sodium thiosulfate in fifty milliliters of water was added. The mixture was further chilled to a temperature of about five degrees and then filtered. The ivory-colored, crystalline product, 6-methyl-21-iodo-1,4-pregnadiene-3,20-dione, was washed with water, air dried and thus used for the following reaction step.

A solution of one gram of 6-methyl-21-iodo-1,4-pregnadiene-3,20-dione in 200 milliliters of acetonitrile was prepared by heating to the boiling point. After cooling to 45 degrees centigrade, the solution was protected from light and 0.8 millilter of fifty percent aqueous solution of silver fluoride was added under stirring. The solution became cloudy and brown colored. Under continued stirring at a temperature between 45 and 50 degrees centigrade, additional silver fluoride solution was added in two 1.5-milliliter portions, one hour apart. Heating and stirring was then continued for a period of two hours. The brown mixture was thereupon filtered through a bed of Celite diatomaceus earth and the filterate exaporated at reduced pressure from a bath at a temperature of fifty degrees centigrade. The brown residue was thoroughly extracted with four thirty-milliliter portions of warm methylene chloride, the methylene chloride extracts combined, concentrated to dryness, and the thus obtained residue recrystallized four times from methanol Skellysolve B hexanes to give pure 1-dehydro-6-methyl-21-fluoroprogesterone.

EXAMPLE 12

*6-methyl-17α,21-dihydroxy-4-pregnene-3,20-dione (6-methyl Reichstein's substance S)*

A solution of 8.21 grams of 6-methylprogesterone in 125 milliliters of tertiary butyl alcohol was prepared by heating to 65 to 70 degrees with stirring under a nitrogen atmosphere. When the solution had cooled to 55 degrees centigrade, 14.6 grams of redistilled ethyl oxalate was added. With continued slow stirring a solution of 3.37 grams of sodium methoxide in methanol (commercial 25 percent solution) was added as rapidly as possible. Almost immediately the reaction mixture became thick with greenish-yellow glyoxylate. Stirring was continued for fifteen minutes during which time the mixture was cooled to 35 degrees. A solution of 3.06 grams of anhydrous sodium acetate and 3.75 grams of glacial acetic acid in 200 milliliters of methanol which had been precooled to ten degrees centigrade, was added, and the mixture stirred until solution was achieved. The greenish-amber colored solution was cooled by means of an ice-salt bath to zero degrees and treated dropwise with continued stirring with a precooled, zero-degree solution of twelve grams of bromine in 120 milliliters of methanol. The bromine was added at such a rate that in twelve minutes 110 milliliters had been added, and the reaction mixture had become colorless. Bromine was then added more slowly in portions until a permanent bromine color remained after five minutes of stirring. The total bromine uptake was 11.4 grams. A solution of 25 milligrams of phenol in 0.25 milliliter of methanol was added. This destroyed the excess bromine and again gave a colorless solution. With continued stirring and cooling a solution of 6.97 grams (5.17 equivalents, determined by equivalents of bromine used plus two plus equivalents $H_2O$) of sodium methoxide in methanol was added in one portion. A bright orange color developed which soon faded to amber and later became green. The cooling bath was removed, the temperature raised to 25 degrees and the solution stirred for three hours. During this period crystallization occured. Acetic acid and four grams of zinc dust were added and stirring continued for one hour. The excess zinc dust was removed by filtration and washed with 25 milliliters of methanol. The combined filtrate was poured slowly with stirring into approximately 2000 milliliters of ice and water. The white precipitate which separated was collected by filtration, washed with 100 milliliters of water, and dried at seventy degrees under vacuum. The crude yield was approximately 8.3 grams of 3-keto-6-methyl-4,17(20)-pregnadiene 21-oic acid methyl ester.

A 1.5 gram sample of the crude material was dissolved in fifty milliliters of benzene and assayed chromatographically on 90 grams of Florisil. The column was eluted in turn with 650 milliliters of five percent acetone-Skellysolve B, 650 milliliters of 7.5 acetone Skellysolve B, 1300 milliliters of ten percent acetone Skellysolve B, 650 milliliters of 12.5 percent acetone-Skellysolve B, and 130 milliliters of acetone. The eluate was collected in 130-milliliter fractions. Fractions 9 to 17 contained a total of 1.255 grams of crystalline methyl 3-keto-6-methyl-4,17(20)-pregnadiene-21-oate.

A solution of 3.01 grams of methyl 3-keto-6-methyl-4,17(20)-pregnadiene-21-oate, three milliliters of pyrrolidine and ninety milligrams of toluenesulfonic acid in sixty milliliters of benzene was heated under reflux for one hour. The water formed in the reaction was co-distilled with the benzene and removed in a water trap. The solvent was distilled under vacuum using nitrogen through a capillary tube. The thus obtained crude enamine, methyl 3-(N-pyrrolidyl)-6-methyl-3,5,17(20)-pregnatriene-21-oate was dissolved in fifty milliliters of benzene and ten milliliters of ether and added to a partial solution of 1.1 grams of lithium aluminum hydride in 175 milliliters of anhydrous ether. The time of addition was five minutes. The reaction mixture was stirred at room temperature (26 degrees centigrade) for 1.5 hours. The excess lithium aluminum hydride was destroyed by the cautious addition of ten milliliters of ethyl acetate. There was then added fifteen milliliters of water. The ether was distilled under vacuum with stirring. The residue was stirred at forty degrees centigrade with 200 milliliters of methanol until homogeneous (3–5 minutes) and 35 milliliters of five percent sodium hydroxide solution was added. After ten minutes at forty degrees centigrade the sodium hydroxide was neutralized by the addition of ten milliliters of acetic acid. The methanol was distilled under vacuum with stirring. The residue was dissolved in fifty milliliters of methylene dichloride and 100 milliliters of water containing fifteen milliliters of concentrated hydrochloric acid. The methylene chloride was separated and the water extracted two times with fifty-milliliters portions of methylene chloride. The methylene chloride solution was washed with water and sodium bicarbonate and concentrated under vacuum to give 2.78 grams of 6-methyl-21-hydroxy-4,17(20) - pregnadien - 3 - one. The crude 6-methyl-21-hydroxy-4,17(20)-pregnadien - 3 - one was dissolved in ten milliliters of pyradine and five milliliters of acetic anhydride. After four hours at 26 degrees centigrade, ten milliliters of water was added to hydrolyze the excess anhydride. Cooling is necessary. The solution was then diluted with methylene dichloride and washed three times with dilute hydrochloric acid, water, sodium bicarbonate, and water. The solvent was distilled under vacuum to give 2.8 grams of a crude crystalline substance which was recrystallized from acetone Skellysolve B to give 1.5 grams of 6-methyl-21-acetoxy-4,17(20)-pregnadien-3-one.

To three millimoles (1.11 grams) of 6-methyl-21-acetoxy-4,17(20)-pregnadien-3-one, dissolved in sixty milliliters of tertiary butyl alcohol and 1.5 milliliters of pyridine at room temperature, was added five milliliters of a solution of osmium tetroxide in tertiary butyl alcohol, the solution containing 11.1 milligrams of osmium tetroxide and 0.2 milliliter of water. Thereupon 2.4 grams of phenyliodosoacetate was added. This dissolved in about twenty minutes. Five-milliliter aliquot samples were removed for titration to follow the reaction procedure. After about 22 hours the reaction was completed and thereupon twenty milliliters of water was added to the mixture. The mixture was then concentrated in vacuo to about twenty milliliters, then twenty milliliters more water was added, again concentrated in vacuo to twenty milliliters, and the residue was thoroughly extracted with ethylene chloride. The extracts were dried with sodium sulfate and chromatographed on eighty grams of Florisil. Three liters of seven percent acetone in ethylene chloride eluted 67.7 percent of theoretical yield of crystalline 6-methyl-17α,21-dihydroxy-4-pregnene-3,20-dione 21 - acetate.

A solution of 4.02 grams of 6-methyl-17α,21-dihydroxy-4-pregnene-3,20-dione 21-acetate in 400 milliliters of methanol was cooled to fifteen degrees and purged for five minutes with oxygen-free nitrogen. To this solution was added a solution of 4.09 grams of potassium carbonate in forty milliliters of water, similarly purged with oxygen-free nitrogen. The mixture was stirred for five and one-half hours, then acidified with sixty milliliters of ice water containing three milliliters of acetic acid. The mixture was concentrated to sixty milliliters, refrigerated and the precipitated solid product was filtered and washed with water. After drying overnight in vacuo, the weight of 6-methyl-17α,21-dihydroxy-4-pregnene-3,20-dione was 3.45 grams (95 percent yield).

EXAMPLE 13

*6-methyl-17α-hydroxy-4-pregnene-3,20-dione*

A solution of one gram (2.77 millimoles) of 6-methyl-17α,21-dihydroxy-4-pregnene-3,20 - dione in seven milliliters of pyridine was cooled to zero degrees and treated with 0.3 milliliter of methanesulfonyl chloride. The solution was allowed to stand at zero to five degrees centigrade for two hours, after which it was diluted with water and extracted with methylene chloride. The extract was washed with cold dilute hydrochloric acid until a pH of two to three was maintained in the aqueous layer, cold sodium bicarbonate solution, water, and dried with anhydrous sodium sulfate. Evaporation at reduced pressure gave a white, glassy product, of 6-methyl-17α,21-dihydroxy-4-pregnene-3,20-dione 21-methanesulfonate.

The crude 21-methanesulfonate of 6-methyl-17α,21-dihydroxy-4-pregnene-3,20-dione was dissolved in fifteen milliliters of acetone and treated with a solution of one gram of sodium iodide and ten milliliters of acetone at reflux temperature. The mixture was kept under reflux with stirring for fifteen minutes. Thereafter the heat was reduced and the mixture concentrated to dryness at reduced pressure to give 6-methyl-17α-hydroxy-21-iodo-4-pregnene-3,20-dione.

The crude 6-methyl-17α-hydroxy-21-iodo-4-pregnene-3,20-dione was slurried with fifteen milliliters of acetic acid and stirred for 45 minutes. Zinc dust was added and stirring continued for fifteen minutes. The excess zinc was removed by filtration. The filtrate was diluted with methylene chloride and washed with water and cold sodium bicarbonate solution until all acetic acid was neutralized. After drying through sodium sulfate the solution was chromatographed over 75 grams of Florisil synthetic magnesium silicate taking fractions of 200 milliliters each. The column was eluted with fourteen fractions of ten percent-Skellysolve B and one fraction of 100 percent acetone. Fractions 8 through 13 contained 766 milligrams of crystals which after recrystallization from acetone-Skellysolve B hexanes yielded crystalline 6-methyl-17α-hydroxy-4-pregnene-3,20-dione.

EXAMPLE 14

*6-methyl-17α-hydroxy-21-fluoro-4-pregnene-3,20-dione*

A solution of four grams of 6-methyl-17α-hydroxy-21-iodo-4-pregnene-3,20-dione (as produced in Example 13) in 800 milliliters of acetonitrile was prepared by heating to the boiling point. After cooling to fifty degrees centigrade, the solution was protected from light and three milliliters of a fifty percent aqueous solution of silver fluoride was added with stirring. The solution became cloudy and brown colored. The addition of a little water did not redissolve the insoluble material. With continued stirring at forty to 45 degrees centigrade, additional silver fluoride solution in two five-milliliter portions was added thirty minutes apart. Heating and stirring was then continued for two hours. The brown mixture was filtered through a bed of Celite diatomaceous earth and the filtrate evaporated at reduced pressure from a fifty degree bath. The brown residue was thoroughly extracted with warm methylene chloride, concentrated to approximately 250-milliliter volume and chromatographed on 150 grams of Florisil synthetic magnesium silicate taking fractions of 200 milliliters each. The column was eluated with 1000 milliliters of ten percent, 2000 milliliters of 12.5 percent, 2000 milliliters of fifteen percent, and 400 milliliters of twenty percent acetone-Skellysolve B hexanes. Fractions 17 through 26 contained 634 milligrams of crystals which after recrystallization from acetone-Skellysolve B hexane yielded 0.48 gram of 6-methyl-17α-hydroxy-21-fluoro-4-pregnene-3,20-dione.

EXAMPLE 15

*6-methyl-17α-hydroxy-21-acetoxy-1,4-pregnadiene-3,20-dione*

One gram of 6-methyl-17α-hydroxy-21-acetoxy-4-pregnene-3,20-dione (6-methyl Reichstein substance S acetate, Example 13) was dissolved in fifty milliliters of tertiary butyl alcohol, 0.5 milliliter of acetic acid, and thereto was added 600 milligrams of selenium dioxide. The mixture was stirred at 75 to 80 degrees for a period of 24 hours, then 600 milligrams more of selenium dioxide was added and the reaction was continued under the same conditions for an additional 24 hours. The mixture was then filtered to eliminate excess selenium dioxide, evaporated to dryness and the residue extracted with ethyl acetate. The extracts were filtered to remove some selenium not removed in the first filtration, and concentrated to a small volume. The product, 6-methyl-21-acetoxy-1,4-pregnadiene-3,20-dione recrystallized on standing.

Hydrolyzing the thus obtained 6-methyl-17α-hydroxy-21-acetoxy-1,4-pregnadiene-3,20-dione in aqueous methanol solution in the presence of potassium carbonate the solution being priorly purged with nitrogen at room temperature provides the 6-methyl-17α,21-dihydroxy-1,4-pregnadiene-3,20-dione.

EXAMPLE 16

*6-methyl-17α-hydroxy-1,4-pregnadiene-3,20-dione*

One gram of 6-methyl-17α-hydroxy-4-pregnene-3,20-dione (Example 13) was dissolved in fifty milliliters of tertiary butyl alcohol and 0.5 milliliter of acetic acid and thereto was added 600 milligrams of selenium dioxide. The mixture was stirred at a temperature of 75 to 80 degrees for 24 hours and then another portion of 600 milligrams of selenium dioxide was added and the reaction continued under the same conditions for an additional 24 hours. The mixture was filtered, evaporated to dryness and the residue extracted with ethyl acetate. The extracts were filtered to remove selenium dioxide left over from the first filtration and concentrated to a small volume. From this concentrated solution, the product 6 - methyl - 17α - hydroxy - 1,4 - pregnadiene - 3,20 dione crystallized upon standing.

EXAMPLE 17

*6-methyl-17α-hydroxy-21-fluoro-1,4-pregnadiene-3,20-dione*

One gram of 6-methyl-17α-hydroxy-21-fluoro-4-pregnene-3,20-dione (Example 14) was dissolved in fifty milliliters of tertiary butyl alcohol and 0.5 milliliter of acetic acid and thereto was added 600 milligrams of selenium dioxide. The mixture was stirred at 75 to 80 degrees for a period of 24 hours, and then 600 milligrams of selenium dioxide was added and the reaction continued under the same conditions for an additional 24 hours. The mixture was then filtered, evaporated to dryness and the residue extracted with ethyl acetate. The extracts were filtered to remove helenium dioxide passed through in the first filtration and concentrated to a small volume. The product 6-methyl-17α-hydroxy-21-fluoro-1,4-pregnadiene-3,20-dione crystallized upon standing.

Substituting for the starting materials in the Examples 7 through 17, instead of the 6-methylprogesterone other 6-alkylprogesterones wherein the alkyl group is ethyl, propyl, isopropyl, butyl, isobutyl, pentyl, hexyl, phenyl, or the like, produces the corresponding 6-alkyl analogs of the compound shown in these examples such as 6-alkyl-21-fluoroprogesterone,
6-alkyldesoxycorticosterone,
1-dehydro-6-alkylprogesterone,
1-dehydro-6-alkyldesoxycorticosterone,
1-dehydro-6-alkyl-21-fluoroprogesterone,
6-alkyl-17α,21-dihydroxy-4-pregnene-3,20-dione,
6-alkyl-17α,21-dihydroxy-1,4-pregnadiene-3,20-dione,
6-alkyl-17α-hydroxyprogesterone,
1-dehydro-6-alkyl-17α-hydroxyprogesterone,
6-alkyl-17α-hydroxy-21-fluoroprogesterone,
1-dehydro-6-alkyl-17α-hydroxy-21-fluoroprogesterone, or the like, wherein the alkyl group is ethyl, propyl, isopropyl, butyl, isobutyl, pentyl, phenyl, hexyl, and the like.

A specific objective of the present invention are also the following compounds having desirable enhanced biological activities:

6α-methyl-21-fluoroprogesterone,
1-dehydro-6-methyl-21-fluoroprogesterone,
6α-methyl-21-iodo-4-pregnene-3,20-dione,
1-dehydro-6-methyl-21-iodoprogesterone,
6-methyl-17α-hydroxy-21-fluoro-4-pregnene-3,20-dione,
6-methyl-17α-hydroxy-21-fluoro-1,4-pregnadiene-3,20-dione,
6α-methyldesoxycorticosterone,
6α-methyl-21-acetoxyprogesterone,
1-dehydro-6-methyldesoxycorticosterone,
21-acetoxy-1-dehydro-6-methylprogesterone,
6α-methyldesoxycorticosterone 21-methanesulfonate, and
1-dehydro-6-methyldesoxycorticosterone 21-methanesulfonate.

These compounds exhibit progestational anti-estrogenic, anti-ovulatory, anti-dysmenorrheal, sedative, tranquilizing, or anti-inflammatory action and are also useful as intermediates for the preparation of other anti-inflammatory compounds. For example, these compounds can be hydroxylated in position 11β with *Cunninghamella blakesleeana* and/or in the 17α-position with Trichothecium to give the corresponding 11 and/or 17-oxygenated compounds which are well known in the art as possessing anti-inflammatory reaction. Increased anti-inflammatory activity can be obtained by introducing in addition to the 11-hydroxy group, the 9-fluoro group by dehydrating the 9,11-position, reacting with hypohalous acids, such as hypobromous acid, cyclizing with a base to give the corresponding 9,11-oxido compound and opening this oxido compound with hydrogen-fluoride. With these procedures, potent topically and internally active anti-inflammatory compounds are obtained as shown in U.S. Patents Nos. 2,897,218, 2,867,633, 2,867,632, 2,867,631, 2,867,634, 2,964,542, 2,867,635, 2,867,636, 2,867,637, and others, including methylprednisolone (6α-methylprednisolone) and fluorometholone (6α-methyl - 9α - fluoro - 11β,17α - dihydroxy - 1,4 - pregnadiene-3,20-dione). Treating 6α-methyl-21-iodo-4-pregnene-3,20-dione with a reducing agent, e.g., zinc dust in acetic acid, and acetylating the resulting product yields medroxyprogesterone (6α - methyl - 17α - acetoxy - 4-pregnene-3,20-dione) useful in the treatment of threatened abortion, dysmenorrhea, and in the estrus control of cattle and domestic animals.

We claim:
1. 1-dehydro-6-methyl-21-fluoroprogesterone.
2. 1-dehydro-6-methyl-21-iodoprogesterone.
3. 6 - methyl - 17α - hydroxy - 21 - fluoro - 1,4 - pregnadiene-3,20-dione.
4. 21-acetoxy-1-dehydro-6-methylprogesterone.
5. 1 - dehydro - 6 - methyldesoxycorticosterone 21-methanesulfonate.

References Cited by the Examiner

UNITED STATES PATENTS 3,067,217  12/1962  Muller et al. _____ 260—397.47
3,118,920  1/1964   Wettstein et al. ____ 260—397.47

OTHER REFERENCES

Tannhauser et al.: J.A.C.S. (1956), volume 78, page 2658.

LEWIS GOTTS, *Primary Examiner.*

ELBERT L. ROBERT, *Examiner.*